United States Patent [19]

Gallacher et al.

[11] 4,166,837

[45] Sep. 4, 1979

[54] SOLVENT-EXTRACTION PROCESS FOR RECOVERY AND SEPARATION OF METAL VALUES

[75] Inventors: Lawrence V. Gallacher, East Norwalk; Rachelle M. Rydzik, Easton, both of Conn.

[73] Assignee: King Industries, Inc., Norwalk, Conn.

[21] Appl. No.: 892,327

[22] Filed: Mar. 31, 1978

[51] Int. Cl.$^2$ .................. C01G 3/00; C01G 9/00; C01G 51/00; C01G 53/00

[52] U.S. Cl. ..................................... 423/24; 423/100; 423/139

[58] Field of Search ......... 423/24, 100, 139, DIG. 14; 75/101 BE; 260/308 B

[56] References Cited

U.S. PATENT DOCUMENTS

| | | | |
|---|---|---|---|
| 3,837,964 | 9/1974 | Cotton et al. | 260/308 B |
| 3,843,667 | 10/1974 | Cupery | 423/24 |
| 3,872,209 | 3/1975 | Hazen et al. | 423/24 |
| 3,878,286 | 4/1975 | Morin et al. | 423/24 |
| 4,018,865 | 4/1977 | Gallacher | 423/139 |
| 4,039,612 | 8/1977 | Price et al. | 423/139 |

OTHER PUBLICATIONS

Morrison et al., *Solvent Extraction in Analytical Chemistry*, John Wiley & Sons, Inc., N.Y. (1957) pp. 56, 57, 110.
Habashi, F., *Principles of Extractive Metallurgy*, vol. 2, Gordon & Breach, N.Y. (1970) pp. 369, 385.

*Primary Examiner*—Brian Hearn
*Attorney, Agent, or Firm*—Morgan, Finnegan, Pine, Foley & Lee

[57] ABSTRACT

The metal value separation efficiencies of alkyl aromatic sulfonic acid in solvent-extraction processes are enhanced by the addition to the solvent-extractant of a fused ring aromatic N-alkyl triazole and, optionally, an aliphatic α-hydroxy oxime. Especially important applications for the improved solvent-extractant are in the separation and recovery of copper from iron, cobalt from nickel, copper from cobalt, cobalt from zinc, nickel from zinc, zinc from iron, nickel from iron, copper from nickel, copper from iron and copper fron zinc.

19 Claims, No Drawings

SOLVENT-EXTRACTION PROCESS FOR RECOVERY AND SEPARATION OF METAL VALUES

This invention relates to a solvent-extractant method for recovering metal values from aqueous media.

BACKGROUND OF THE INVENTION

Copending U.S. patent application Ser. No. 785,669, filed Apr. 7, 1977, incorporated herein by reference, describes the use of water-immiscible solutions alkyl aromatic sulfonic acids, particularly didodecylnaphthalene sulfonic acid, alone or in combination with an $\alpha$-hydroxy oxime, as solvent-extractants for metal values in aqueous media.

Gallacher, U.S. Pat. No. 4,018,865, also incorporated herein by reference, describes the separation of difficult to separate metal value pairs using an alkylaromatic sulfonic acid and an $\alpha$-hydroxy oxime in a water immiscible liquid as a superior solvent-extractant.

It has now been discovered that the selective extraction efficiency of the foregoing solvent-extractants comprising an alkyl aromatic sulfonic acid, alone, or combined with an $\alpha$-hydroxy oxime, can be vastly improved by the addition of a fuzed ring aromatic N-alkyl triazole. Four significant effects have been observed following the addition of the triazole to the solvent-extractant: (i) faster extraction kinetics; (ii) improved selectively as between components in the metal pairs; (iii) increased extraction of the first metal value in the pair; and (iv) improved chemical stability of the extractant when in contact with typical stripping acids. These advantages will become apparent from the Examples hereinafter set forth.

SUMMARY OF THE INVENTION

According to the present invention, there is provided a process for recovering a first metal value from an aqueous solution comprising a pair of said first metal value and a second metal value, said pair being selected from the group consisting of copper and iron, cobalt and nickel, copper and cobalt, cobalt and zinc, nickel and zinc, zinc and iron, nickel and iron, copper and nickel, copper and iron, and copper and zinc, said process comprising contacting said aqueous solution with a solvent extractant consisting of (i) an alkyl aromatic sulfonic acid having a molecular weight of at least about 400, (ii) a fuzed ring aromatic N-alkyl triazole and (iii) a water-immiscible solvent for (i) and (ii) and metal complexes thereof to provide a solution of said metal values in said solvent-extractant, the mole % of (ii) in the combined (i) and (ii) being in the range of 10 to 95; separating the solution thus formed from the aqueous raffinate depleted in said first metal value; and recovering said first metal value from said separated solution.

In preferred embodiments, the mole % of (ii) based on (i) and (ii) will be in the range of 25 to 88; the alkyl aromatic sulfonic acid (i) is a polyalkyl aromatic sulfonic acid, especially preferably, dinonylnaphthalene sulfonic acid or didodecylnaphthalene sulfonic acid; the fuzed ring aromatic N-alkyl triazole is N-nonylbenzotriazole or N-dodecylbenzotriazole; the first metal value is recovered from the separated solvent-extractant solution by acid stripping; and the metal pair comprises copper and iron.

In another preferred feature, the invention contemplates a process as above-defined wherein the solvent-extractant also includes (iv) an aliphatic $\alpha$-hydroxy oxime of the formula

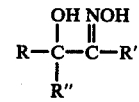

wherein R and R' are aliphatic hydrocarbon radicals and R" is hydrogen or an aliphatic hydrocarbon radical, the mole % of (i) in the combined (i) and (iv) being in the range of 10 to 95, and the mole % of (ii) in the combined (i), (ii) and (iv) being in the range of 10 to 95.

Preferred sub-features of this embodiment are those wherein the mole % of (ii) in the combined (i), (ii) and (iv) is in the range of 31 to 87; in which the $\alpha$-hydroxy oxime is 5,8-diethyl-7-hydroxydodecan-6-one oxime; and the pairs to be separated comprise cobalt and nickel; copper and cobalt; cobalt and zinc; nickel and zinc; zinc and iron; nickel and iron; copper and nickel; copper and iron; and copper and zinc.

Many of the modern mining and metallurgical procedures can be carried out to produce suitable aqueous metal feed solutions for the present process. The process of the present invention has specific application to the separation of copper values from an aqueous solution of copper and iron values, nickel values from an aqueous solution of cobalt and nickel values. The process can be used to obtain a first solvent fraction concentrated in either copper or nickel, as the case may be, and an aqueous raffinate fraction concentrated in iron or cobalt. Further, the process also has specific and advantageous application to the separation of other difficult to separate metals in aqueous solutions. These additional mixtures comprise the pairs of metals set forth above.

The alkyl aromatic sulfonic acids having a molecular weight of at least about 400 (i) used in practicing the present process can vary widely in chemical nature, so long as they have a minimum molecular weight of about 400 and at least one, and preferably two, alkyl groups on the aromatic sulfonic acid nucleus. If a phenyl nucleus is present, these requirements can be met with a benzene sulfonic acid containing at least two alkyl groups having a total of 20 carbon atoms, e.g., didecylbenzenesulfonic acid, or four alkyl groups having a total of 20 carbon atoms, e.g., tetrapentylbenzenesulfonic acid. Alkylaromatic polysulfonic acids should also have a ratio of molecular weight to number of sulfonic acid groups of at least 400:1. Instead of a phenyl nucleus, the aromatic nucleus can be polycyclic, e.g., naphthalene, anthracene, phenanthrene, tetrahydronaphthalene, etc. Many variations in the position of subsitution are possible and contemplated and mixed positional isomers are included. The alkyl substituents can be straight or branched chain. Additional groups such as hydroxy, ether, halogens, etc., can also be present. Best results are obtained with maximum variations in substituent locations and with maximum branching.

The most preferred alkylaromatic sulfonic acids are branched polyalkyl substituted naphthalene sulfonic acids. These are available, for example, by sulfonating polyalkylnaphthalenes. The polyalkylnaphthalenes can be made by alkylating naphthalene with olefins, for example, propylene trimer or tetramer, or alkyl halides, with a suitable catalyst, e.g., hydrogen fluoride or anhydrous aluminum chloride in a suitable solvent such as naphtha, sulfur dioxide, nitrobenzene or a mixture of benzene and nitrobenzene. See Robert G. King and George W. Thielcke, U.S. Pat. No. 2,764,548, assigned to the assignee of the present invention. Such a process produces naphthalene substituted with alkyl groups and, if a branched olefin is used, such as propylene trimer or propylene tetramer,—obtained by polymerizing propylene by an acid catalyst such as phosphoric acid, then the alkyl groups will be highly branched as well. Sulfonation is obtained by treating the polyalkylaromatic with a sulfonating agent. For example, the dialkyl aromatic compound is dissolved in an inert solvent, such as petroleum naphtha, hexane, heptane, octane, chlorinated solvents, and the like, and sulfuric acid, preferably oleum, is introduced into the solution at the desired temperature and with agitation. After reaction is complete, the sulfonic acid—and also some polysulfonic acid—is recovered by adding water to selectively extract any polysulfonic acid, leaving the alkylaromatic sulfonic acid in the organic phase. Detailed techniques for preparing dinonylnaphthalene sulfonic acid, didodecylnaphthalene sulfonic acid and isomers and analogs thereof, including the benzene analogs, is described in the King et al patent, U.S. Pat. No. 3,764,548, incorporated herein by reference.

The fuzed ring aromatic N-alkyl triazole (ii) used in practicing the present process can also vary widely in chemical nature. For example, it can be mono- or polycyclic, but it must contain at least enough carbon atoms so as to render the compound very insoluble in water. By way of illustration $C_6+$ N-alkyl groups reduce the water solubility of unacceptable benzotriazole from 1% down to less than 0.1% by weight. N-nonyl- and N-dodecylbenzotriazoles are exemplary of superior components (ii). Others can be used, however, such as inertly ring-substituted triazoles, e.g., carbanoyl-substituted benzotriazoles. It should be noted also that, for example, nonyl benzotriazole can consist of a mixture of 1- and 2-isomers, the 2-isomer after being the principal product. While the equilibrium Ni/Co selectivity of mixtures containing 1-substituted isomer (1-NBT) appears to be slightly higher than that of mixtures containing the 2-isomer (2-NBT), experiments indicate that 1-NBT protonates readily in the presence of strong aqueous sulfuric acid and, therefore, a preference may exist to use mixtures wherein 98% or better of the NBT component is the 2-isomer.

The benzotriazoles can be made by procedures well known to those skilled in this art. For example, an unsubstituted benzotriazole can be alkylated with nonene, decene or other appropriate $C_6$-$C_{30}$ olefin in the presence of an acid treated clay catalyst at a conventional temperature, e.g., 140° C.

In general, any of the α-hydroxy oximes described in U.S. Pat. No. 3,224,873, incorporated herein by reference, are suitable for use in certain embodiments of the present process. In general, these α-hydroxy oxime extractants (iv) have the formula:

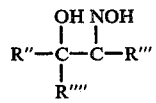

wherein R", R'" and R"" may be any of a variety of organic hydrocarbon radicals such as aliphatic and alkylaryl radicals, R" may also be hydrogen. Preferably, R' and R'" are unsaturated hydrocarbon or branched chain alkyl groups, containing from about 4 to 20 carbon atoms, R' and R'" are also preferably the same, and when alkyl are preferably attached to the carbons substituted with the —OH and =NOH groups attached through a secondary carbon atom. It is also preferred that R"" is hydrogen or unsaturated hydrocarbon or branched chain alkyl hydrogen or unsaturated hydrocarbon or branched chain alkyl group containing from about 4 to 20 carbon atoms. The α-hydroxy oximes also preferably contain a total of about 10 to 42 carbon atoms. Representative compounds are given in the foregoing reference and processes are disclosed for preparing them.

Typical compounds are 19-hydroxyhexatriconta-9,27-dien-18-oxime; 5,10-diethyl-8-hydroxytetradecan-7-oxime; and 5,8-diethyl-7-hydroxydodecan-6-one oxime. The latter compound has the following structural formula:

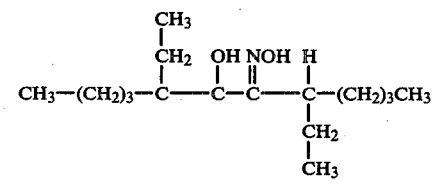

Representative of other mono- and poly-unsaturated radicals are heptenyl, octenyl, decenyl, dodecenyl, octadecenyl and alkyl substituted radicals such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl, and the like.

The α-hydroxy oxime component is also characterized as having a solubility of at least 2% by weight in the hydrocarbon solvent used to make up the organic phase and substantially complete insolubility in water.

The solvent-extractant, as contemplated above, includes (i) an aromatic sulfonic acid, (ii) a fuzed ring aromatic N-alkyltriazole, (iii) a water-immiscible solvent, and, optionally, (iv) an aliphatic α-hydroxy oxime and for (i), (ii) and (iv) and metal complexes thereof. A wide variety of water-immiscible organic solvents (diluents), in which the extraction reagents (i), (ii) and (iv) are dissolved, can be employed according to this invention. The minimum requirements for the diluent (iii), however, are that the diluent be substantially water-immiscible, that it will dissolve the extraction reagents, and that it will not interfere with the function of the reagent in extracting the metal values from acid solutions. These diluents can be aliphatic or aromatic hydrocarbons, halogenated hydrocarbons, petroleum derivatives, ethers, etc. Examples of these various diluents include toluene, carbon tetrachloride, benzene, xylene, fuel oil, chloroform, 2-ethyl-hexanol, kerosene and particularly normal aliphatic hydrocarbons of 10 to 13 carbon atoms (Norpar-12).

Generally, the alkyl aromatic sulfonic acid extractant will be present in the organic phase in an amount sufficient to extract at least a portion of the first metal values, e.g., copper or cobalt values, from the aqueous solutions. Preferably, the alkyl aromatic sulfonic acid will be present in the amount of from about 1 to about 25% by weight based on the total organic phase with an amount of from 2 to 15% by weight being particularly preferred.

Although the volumetric phase ratios of the organic extractant to the aqueous solution can vary depending upon several factors including the amount of first metal present in the aqueous phase and the concentrations of alkyl aromatic sulfonic acid and benzotriazole (ii) and optional hydroxy oxime (iv) in the organic phase, generally, volumetric phase ratios of from about 1:3 to about 3:1 will be used. These ratios will extract essentially all of the first metal from the aqueous solution within a small number of extraction stages, e.g., 5 or less. In continuous column extractors or similar equipment, 5 or fewer contacts or theorectical plates will normally suffice. Under most circumstances, an extraction or contacting period per stage of at most five minutes is sufficient, although the extraction time usually may be reduced to 1 or 2 minutes, and often 30 seconds or less.

The solvent-extractant reagent may be contacted with the metal containing aqueous feed by any of the well-known procedures employed in solvent-extractions. While continuous countercurrent methods are preferred, batch, continuous batch, and batch countercurrent methods may also be used. The liquid-liquid contacting means may comprise a pulse column, a counter-current rotating disc column, and other known systems. Mixing may be carried out at conventional temperatures, advantageously in the range of about 10° C. to 40° C.

After the first metal values have been transferred to the organic phase and the aqueous and organic phases separated, the organic phase containing the first metal value is stripped in and suitable liquid-liquid contactor. In the stripping operation, the first metal containing organic phase is contacted with 10 to 150% by volume of a mineral acid, e.g., sulfuric, nitric or hydrochloric, the choice of acid depending on the anion of the metal required.

For convenience, the extraction, separation of phases and stripping operations may be carried out on a test basic in separatory funnels. These correlate well with commercial size operations. Equipment useful in commercial practice is well known and is described in Mining Engineering, 17, pp. 76–80, December, 1965. The determination of maximum loading capacity of the organic solution for metals, equilibrium isotherms for extraction and stripping, and use of the equilibrium isotherms for determining the number of extraction stages required for substantially complete removal of the metal are set forth in the article, which is incorporated herein by reference.

In a commercial operation, the aqueous feed and the extractant solutions are fed in the desired ratio into a small agitated mixer. After mixing for one to two minutes, or less, the mixture overflows to a settler for a period of about five minutes, residence. The phases are then separated continuously, the aqueous raffinate being drawn off and the organic layer transferred to an agitated stripper vessel where acid is added and mixed for about one to two minutes or less. The mixture is then transferred to a settler where, after a few minutes, the phases are separated.

DESCRIPTION OF THE PREFERRED EMBODIMENTS

The following examples illustrate the process of the present invention, but are not intended to limit it in any manner whatsoever. In addition, certain comparative procedures are set forth to permit the advantages in proceeding according to the present invention to be clearly evident.

$$K_{A/B} = \frac{(\% \ A \ \text{extracted}) \ (100 \ - \ \% \ B \ \text{extracted})}{(\% \ B \ \text{extracted}) \ (100 \ - \ \% \ A \ \text{extracted})}.$$

EXAMPLES 1–8

An aqueous feed solution is prepared comprising the following: $Cu^{+2}$, 2 g./l.; $Fe^{+3}$, 2 g./l.; $Fe^{+2}$, 0.4 g./l., all as sulfates, and adjusted with acid to pH 1.4. Solvent-extractant solutions comprising aromatic hydrocarbon and, respectively, nonylbenzotriazole or dodecylbenzotriazole, mixtures of nonylbenzotriazole or dodecylbenzotriazole and didodecylnaphthalene sulfonic acid, and didodecylnaphthalene sulfonic acid, itself, are prepared. The extractions are carried out in a 50 ml graduate by mixing 25 ml portions of the respective solvent-extractants with 25 ml portions of the aqueous feed for 1 minute at room temperature (23° C.), and allowing the layers to separate. A portion of the aqueous raffinate is then diluted 1:200 with deionized water and then analyzed for copper and iron using atomic absorption. The percentages of copper and iron extracted are then determined, with the results set forth in Table 1:

Table 1

| | Separation of Copper from Iron | | | | |
|---|---|---|---|---|---|
| Ex. | Nonylbenzo-triazole, moles/l. | Didodecyl Naphthalene sulfonic acid, moles/l. | Copper extracted % | Iron extracted % | Selectivity $K_{Cu/Fe}$ |
| 1A* | .312 | .000 | 2.0 | 0.4 | 5.1 |
| 1 | .250 | .033 | 28.0 | 5.0 | 7.4 |
| 2 | .218 | .050 | 38.0 | 9.2 | 6.1 |
| 3 | .156 | .084 | 49.0 | 18.8 | 4.1 |
| 4 | .094 | .117 | 54.0 | 24.6 | 3.6 |
| 4A* | .000 | .167 | 51.5 | 53.3 | 0.9 |
| Ex. | Dodecyl-benzotri-azole, moles/l. | Didodecyl Naphthalene sulfonic acid, moles/l. | Copper extracted % | Iron extracted % | Selectivity $K_{Cu/Fe}$ |
| 5 | .213 | .033 | 21.0 | 12.4 | 1.9 |
| 6 | .186 | .050 | 28.0 | 16.7 | 1.9 |
| 7 | .133 | .084 | 38.5 | 29.2 | 1.5 |
| 8 | .080 | .117 | 46.5 | 43.8 | 1.1 |
| 8A* | .000 | .167 | 57.5 | 60.8 | 0.9 |

*Control

It can be seen that addition of the benzotriazole to the known alkylaromatic sulfonic acid improves selectivity, especially when nonylbenzotriazole is used.

EXAMPLES 9–10

An aqueous feed solution is prepared, containing 2 g./l. of nickel and 2 g./l. of cobalt in the sulfate form and adjusted to pH of 1.5. A solvent extractant comprising a normal paraffinic solvent (Norpar 12) 0.05 moles/l. of didodecylnaphthalene sulfonic acid, 0.96 moles/l. of N-nonylbenzotriazole and 0.1 moles/l. of 5,8-diethyl-7-hydroxydodecan-6-one oxime is prepared. For comparison purposes, a solvent-extractant without any N-nonobenzotriazole is prepared. 25 ml. of aqueous feed is shaken for one minute with 25 ml. of each extractant, the layers allowed to separate; and the raffinate is analyzed for residual cobalt and nickel contents. The procedures are repeated, except the extraction times are increased from 1 minute to 5 minutes. The results obtained are set forth in Table 2:

Table 2

| | Separation of Cobalt and Nickel | | | |
|---|---|---|---|---|
| Ex. | Equilibration time, min. | Cobalt extracted % | Nickel extracted % | Nickel/ Cobalt Selectivity | 1 min/5 min Selectivity ratio |
| 9A* | 1 | 26.0 | 14.0 | 0.5 | |
| 10A* | 5 | 12.3 | 32.8 | 3.5 | .14 |
| 9 | 1 | 8.0 | 43.8 | 9.0 | |
| 10 | 5 | 6.0 | 47.5 | 14.2 | .63 |

*Control - no N-nonylbenzotriazole in solvent-extractant.

These results demonstrate faster extraction kinetics for the solvent-extractant according to this invention.

It is seen that the controls give high equilibrium separation factors (selectivity), but equilibration is very slow with nickel in the aqueous phase. The reason for the behavior of the controls is that the kinetics of cobalt extraction are very fast, while nickel extracts slowly. However, at equilibrium, nickel extraction is much higher than cobalt extraction. The result is that selectivity is kinetically controlled at short mixing times near one minute, but shows equilibrium control at long times. Therefore, one measure of nickel extraction rate (reaction kinetics) is given by the ratio of 1 minute selectivity to 5 minute selectivity. The closer this ratio approaches 1.0, the faster the nickel extracts.

It can be seen that the 1 minute to 5 minute selectivity of 0.14 shown by the control is increased up to 0.63 with the solvent-extractant according to this invention, demonstrating much faster nickel extraction kinetics.

EXAMPLES 11-12

An aqueous feed solution containing 2 g./l. of nickel and 2 g./l. of cobalt as the sulfates is prepared and adjusted to pH 1.5. A solvent-extractant comprising 0.067 moles/l. of didodecylnaphthalene sulfonic acid, 0.075 moles/l. of 5,8-diethyl-7-hydroxydodecan-6-one oxime and 0.96 moles/l. of N-nonylbenzotriazole (.84:1 molar ratio of 2-N isomer to 1-N isomer) in paraffinic hydrocarbon (Norpar 12) is prepared, and for comparison purposes a solvent-extractant without the benzotriazole is also prepared. The aqueous feed is contacted with the respective solvent-extractants for 1 minute and for 5 minutes as described above and the raffinates are analyzed with the results set forth in Table 3:

Table 3

| | Separation of Cobalt from Nickel | | | |
|---|---|---|---|---|
| Example | Equilibration time, min. | Cobalt extracted, % | Nickel extracted, % | Ni/Co Selectivity |
| 11A* | 1 | 7.0 | 38.0 | 8.1 |
| 12A* | 5 | 7.3 | 38.3 | 7.9 |
| 11 | 1 | 7.0 | 49.3 | 12.9 |
| 12 | 5 | 7.0 | 48.8 | 12.7 |

Control - No N-nonylbenzotriazole in solvent-extractant.

The foregoing results show a significant increase in both the percent nickel extracted and in the Ni/Co selectivity with the addition of the nonylbenzotriazole to the solvent-extractant. Because the 1 minute and 5 minute selectivities are substantially the same for the controls, the system is at equilibrium and the improvement is in equilibrium selectivity.

EXAMPLES 13-17

The dependency of the enhanced equilibrium extraction upon molar concentration of nonylbenzotriazole is demonstrated by preparing an aqueous feed solution comprising 2 g./l. of nickel and 2 g./l. of cobalt, both as sulfates, and adjusting the pH to 1.5. A solvent-extractant is prepared comprising 0.067 mole/l. of didodecylnaphthalene sulfonic acid and 0.075 moles/l. of 5,8-diethyl-7-hydroxydodecan-6-one oxime in paraffinic hydrocarbon solvent. To portions of this are added 2-N-nonylbenzotriazole to make a series of solvent-extractants according to this invention. The extractants after 1 minute equilibration are separated and stripped for 1 minute with 4 N sulfuric acid. Results are set forth in Table 4:

Table 4

| | Separation of Nickel from Cobalt | | | | |
|---|---|---|---|---|---|
| Example | 2-N-nonyl benzotriazole, moles/l. | Cobalt extracted, % | Nickel extracted, % | Ni/Co selectivity | Cobalt stripped, % | Nickel stripped, % |
| 13A* | 0.00 | 6.5 | 35.3 | 7.9 | 100 | 67.4 |
| 13 | 0.064 | 5.5 | 38.0 | 10.5 | 100 | 60.5 |
| 14 | 0.19 | 5.8 | 41.3 | 11.4 | 100 | 58.5 |
| 15 | 0.32 | 5.8 | 42.3 | 11.9 | 100 | 58.6 |
| 16 | 0.64 | 5.8 | 44.5 | 13.0 | 100 | 54.5 |
| 17 | 0.96 | 5.8 | 45.8 | 13.7 | 100 | 52.5 |

Control

The foregoing data show a significant improvement in the Ni/Co selectivity with the addition of even small amounts of nonylbenzotriazole. It is also demonstrated that stripping efficiency falls off slightly but not critically with the addition of nonylbenzotriazole to the system.

EXAMPLES 18-23

An aqueous feed solution is prepared containing 2 g./l. of cobalt, as the sulfates, and divided into portions. The portions are adjusted to various pH's in the range of 0.5 to 3.5. A solvent-extractant is prepared comprising 0.096 moles/l. of 5,8-diethyl-7-hydroxydodecan-6-one oxime and 0.05 moles/l. of didodecylnaphthalene sulfonic acid and 0.96 moles/l. of nonylbenzotriazole in paraffinic hydrocarbon (Norpar-12). For comparison purposes, a solvent-extractant without the nonylbenzotriazole is also prepared. The extraction results after 1 minute contacting times are summarized in Table 5.

Table 5

Separation of Nickel from Cobalt

| Example | Feed pH | Cobalt extracted, % | Nickel extracted, % | Selectivity Ni/Co |
|---|---|---|---|---|
| 18A* | 0.5 | 4.75 | 2.50 | .51 |
| 19A* | 1.5 | 26.5 | 15.8 | .52 |
| 20A* | 2.0 | 15.0 | 33.3 | 2.82 |
| 21A* | 2.5 | 10.0 | 37.5 | 5.40 |
| 22A* | 3.0 | 9.5 | 37.8 | 5.78 |
| 23A* | 3.5 | 8.0 | 78.5 | 7.20 |
| 18 | 0.5 | 4.25 | 4.0 | .94 |
| 19 | 1.5 | 13.0 | 33.8 | 3.41 |
| 20 | 2.0 | 6.5 | 47.8 | 13.2 |
| 21 | 2.5 | 5.0 | 47.8 | 17.4 |
| 22 | 3.0 | 3.8 | 47.0 | 22.8 |
| 23 | 3.5 | 3.0 | 46.5 | 28.1 |

Control

The foregoing demonstrates increased nickel extraction and increased effectiveness in Ni/Co selectivity at high pH with the addition of alkylbenzotriazole according to this invention.

EXAMPLE 24

The improved chemical stability of the solvent extractant according to this invention in contact with stripping acids is demonstrated by comparing the relative retention of selectivity of two solvent-extractants, one without nonylbenzoltriazole and one with after continuous contact with 4 N sulfuric acid at room temperature over a long period of time. A solvent-extractant comprising 0.50 moles/l. of didodecylnaphthalene sulfonic acid, 0.56 moles/l. of 5,8-diethyl-7-hydroxydodecan-6-one oxime and 0.96 moles/l. of nonylbenzotriazole in paraffinic hydrocarbon is prepared. For comparison purposes a solvent-extractant comprising 0.067 moles/l. of didodecylnaphthalene sulfonic acid and 0.075 moles/l. of 5,8-diethyl-7-hydroxydodecan-6-one oxime in the hydrocarbon solvent is also prepared. A quantity of each solvent-extractant is placed in a 1 pint bottle and a equal volume of 4 N sulfuric acid stripping solution is added to the bottle. The two bottles are sealed and shaken continuously. An aqueous feed solution is prepared comprising 2 g./l. each of nickel and cobalt in sulfate form and adjusted to pH 1.5. Periodically, equal volumes of organic and aqueous phases are removed from each bottle and the organic phases are used to contact the aqueous feeds for one minute. The results are set forth in Table 6.

Table 6

Separation of Cobalt from Nickel

| Example | Time Period, Weeks | Cobalt extracted, % | Nickel extracted, % | Selectivity Ni/Co |
|---|---|---|---|---|
| 24* | 0 | 5.3 | 34.5 | 9.5 |
|  | 1 | 8.3 | 34.5 | 5.9 |
|  | 2 | 10.0 | 34.5 | 4.7 |
|  | 3 | 12.3 | 35.3 | 3.9 |
|  | 4 | 13.5 | 34.0 | 3.3 |
|  | 5 | 15.3 | 33.0 | 2.7 |
|  | 6 | — | — | — |
|  | 7 | — | — | — |
|  | 8 | 18.0 | 29.0 | 1.9 |
|  | 9 | 17.5 | 30.0 | 2.0 |
| 24 | 0 | 5.3 | 35.6 | 9.9 |
|  | 1 | 5.3 | 35.6 | 9.9 |
|  | 2 | 5.0 | 35.0 | 10.2 |
|  | 3 | — | — | — |
|  | 4 | 6.3 | 36.0 | 8.4 |
|  | 5 | — | — | — |
|  | 6 | 6.8 | 37.0 | 8.1 |
|  | 7 | — | — | — |
|  | 8 | 6.0 | 34.5 | 8.3 |
|  | 9 | — | — | — |

Control - No nonylbenzotriazole in solvent-extractant.

As Table 6 shows, inclusion of nonylbenzotriazole greatly improves the stability of the solvent-extractant as measured by the constancy of the Ni/Co selectivity over a period of six weeks or more. In the case of the control solution, the cobalt extraction increases rapidly. After 48 days the increase in cobalt extraction is 240%, while the nickel extraction decreases by approximately 20%. With the NBT-modified system, the percent increase in cobalt extraction over a six-week period is only 28%, but this is accompanied by a beneficial increase in nickel extraction of 4%.

EXAMPLES 25-32

The use of the solvent-extractants according to this invention with other metal pairs is demonstrated by preparing a series of aqueous feed solutions, each containing two different metals as the sulfates. In the case of feed solutions containing iron, the iron is present as a mixture of $Fe^{+3}$ and $Fe^{+2}$. The solvent-extractant comprised 0.067 moles/l. of didodecylnaphthalene sulfonic acid, 0.075 moles/l. of 5,8-diethyl-7-hydroxydodecan-6-one oxime and 0.96 moles/l. of 2-nonylbenzotriazole in paraffinic hydrocarbon (Norpar-12). For comparison purposes, a solvent-extractant is prepared omitting the benzotriazole. Extractions are made by shaking equal parts of feed and solvent-extractant for 1 min. at room temperature. The results are set forth in Table 7.

Table 7

Separation of Metal Value Pairs

| Example | Metal Pair, A/B | pH | A, g./l. | B, g./l. | Selectivity A/B |
|---|---|---|---|---|---|
| 25A* | $Cu^{+2}/Co^{+2}$ | 2.21 | 2.0 | 2.0 | 142.7 |
| 26A* | $Co^{+2}/Zn^{+2}$ | 1.78 | 2.0 | 2.0 | 1.81 |
| 27A* | $Ni^{+2}/Zn^{+2}$ | 1.92 | 2.0 | 2.0 | 11.59 |
| 28A* | $Zn^{+2}/Fe$ | 1.62 | 2.0 | 4.4** | 1.87 |
| 29A* | $Ni^{+2}/Fe$ | 1.68 | 2.0 | 2.4*** | 8.03 |
| 30A* | $Cu^{+2}/Ni^{+2}$ | 1.79 | 2.0 | 2.0 | 10.27 |
| 31A* | $Cu^{+2}/Fe$ | 1.28 | 2.0 | 2.4*** | 117.2 |
| 32A* | $Cu^{+2}/Zn^{+2}$ | 1.88 | 2.0 | 2.0 | 448.5 |
| 25 | $Cu^{+2}/Co^{+2}$ | 2.21 | 2.0 | 2.0 | 75.7 |
| 26 | $Co^{+2}/Zn^{+2}$ | 1.78 | 2.0 | 2.0 | 1.77 |
| 27 | $Ni^{+2}/Zn^{+2}$ | 1.92 | 2.0 | 2.0 | 7.83 |
| 28 | $Zn^{+2}/Fe$ | 1.62 | 2.0 | 4.4** | 1.31 |
| 29 | $Ni^{+2}/Fe$ | 1.68 | 2.0 | 2.4*** | 3.76 |
| 30 | $Cu^{+2}/Ni^{+2}$ | 1.79 | 2.0 | 2.0 | 7.15 |
| 31 | $Cu^{+2}/Fe$ | 1.28 | 2.0 | 2.4*** | 37.5 |
| 32 | $Cu^{+2}/Zn^{+2}$ | 1.88 | 2.0 | 2.0 | 155.4 |

Control - No nonylbenzotriazole in solvent-extractant.
**4.0 $Fe^{+3}$/0.4 $Fe^{+2}$
*** 2.0 $Fe^{+3}$/0.4 $Fe^{+2}$ In every case, the addition of 2-nonylbenzotriazole to the sulfonic acid/hydroxyoxime mixture results in an improvement in selectivity. In some instances, e.g., Cu/Co; Cu/Fe and Cu/Zn, the improvement is enough to essentially eliminate extraction of the less preferred embodiment.

EXAMPLES 33–34

An aqueous feed solution is prepared, containing 2 g./l. of nickel and 2 g./l. of cobalt in the sulfate form and adjusted to pH of 1.5. A solvent extractant comprising a normal paraffinic solvent (Norpar 12), 0.074 moles/l. of dinonylnaphthalene sulfonic acid, 0.96 moles/l. of N-nonylbenzotriazole and 0.076 moles/l. of 5,8-diethyl-7-hydroxydodecan-6-one oxime is prepared. For comparison purposes, a solvent-extractant without any N-nonylbenzotriazole is prepared. 25 ml of aqueous feed is shaken for one minute with 25 ml. of each extractant, the layers allowed to separate; and the raffinate is analyzed for residual cobalt and nickel contents. The procedures are repeated, except that extraction times are increased from 1 minute to 5 minutes. The results obtained are set forth in Table 8:

Table 8

| | Separation of Cobalt and Nickel | | | |
|---|---|---|---|---|
| Ex. | Equilibration time, min. | Cobalt extracted % | Nickel extracted % | Nickel/Cobalt Selectivity |
| 33A* | 1 | 43.8 | 61.5 | 2.05 |
| 34A* | 5 | 44.0 | 61.3 | 2.01 |
| 33 | 1 | 40.3 | 64.5 | 2.70 |
| 34 | 5 | 40.3 | 65.0 | 2.76 |

*Control - no N-nonylbenzotriazole in solvent-extractant.

These results demonstrate the improvement in selectivity for the solvent extraction of cobalt and nickel according to this invention.

From the foregoing it is seen that alkylbenzotriazoles are extremely useful synergists for the selective extraction of a variety of metals in sulfonic acid and sulfonic acid/oxime systems.

Obviously, many variations of the invention will suggest themselves in view of the detailed description. All such obvious variations are within the full intended scope of the appended claims.

We claim:

1. A process for recovering a first cationic metal value from an aqueous solution comprising a pair of said first cationic metal value and a second cationic metal value, said pair being selected from the group consisting of copper (II) and iron, cobalt (II) and nickel, copper (II) and cobalt (II), cobalt (II) and zinc, nickel and zinc, zinc and iron, nickel and iron, copper (II) and nickel, copper (II) and iron, and copper (II) and zinc, said process comprising contacting said aqueous solution at a pH of below 3.5 with a solvent extractant consisting of (i) an alkyl aromatic sulfonic acid having a molecular weight of at least about 400, (ii) a fuzed ring aromatic N-alkyl triazole and (iii) a water-immiscible solvent for (i) and (ii) and metal complexes thereof to provide a solution of said metal-value in said solvent-extractant, the mole % of (ii) in the combined (i) and (ii) being in the range of 10 to 95; separating the solution thus formed from the aqueous raffinate depleted in said first metal value; and recovering said first metal value from said separated solution.

2. A process as defined in claim 1 wherein said alkyl aromatic sulfonic acid (i) is a polyalkyl aromatic sulfonic acid.

3. A process as defined in claim 2 wherein said sulfonic acid is dinonylnaphthalene sulfonic acid.

4. A process as defined in claim 2 wherein said sulfonic acid is didodecylnaphthalene sulfonic acid.

5. A process as defined in claim 1 wherein said fuzed ring aromatic N-alkyl triazole (ii) is N-nonylbenzotriazole.

6. A process as defined in claim 1 wherein said fuzed ring aromatic N-alkyltriazole (ii) is N-dodecylbenzotriazole.

7. A process as defined in claim 1 wherein said first metal value is recovered from said separated solution by acid stripping.

8. A process as defined in claim 1 wherein said metal pair comprises copper (II) and iron.

9. A process as defined in claim 1 wherein said solvent-extractant also includes (iv) an aliphatic α-hydroxy oxime of the formula

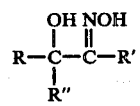

wherein R and R' are aliphatic hydrocarbon radicals and R" is hydrogen or an aliphatic hydrocarbon radical, the mole % of (i) in the combined (i) and (iv) being in the range of 10 to 95, and the mole % of (ii) in the combined (i), (ii) and (iv) being in the range of 10 to 95.

10. A process as defined in claim 9 wherein said aliphatic α-hydroxyoxime comprises 5,8-diethyl-7-hydroxydodecan-6-one oxime.

11. A process as defined in claim 9 wherein said metal pair comprises cobalt (II) and nickel.

12. A process as defined in claim 9 wherein said metal pair comprises copper (II) and cobalt.

13. A process as defined in claim 9 wherein said metal pair comprises cobalt (II) and zinc.

14. A process as defined in claim 9 wherein said metal pair comprises nickel and zinc.

15. A process as defined in claim 9 wherein said metal pair comprises zinc and iron.

16. A process as defined in claim 9 wherein said metal pair comrises nickel and iron.

17. A process as defined in claim 9 wherein said metal pair comprises copper (II) and nickel.

18. A process as defined in claim 9 wherein said metal pair comprises copper (II) and iron.

19. A process as defined in claim 9 wherein said metal pair comprises copper (II) and zinc.

* * * * *